United States Patent
Phillips (10) Patent No.: US 11,566,670 B1
(45) Date of Patent: Jan. 31, 2023

(54) SENSOR BEARING HOUSING

(71) Applicant: Regal Beloit America, Inc., Beloit, WI (US)

(72) Inventor: Scott Phillips, Valparaiso, IN (US)

(73) Assignee: Regal Beloit America, Inc., Beloit, WI (US)

( * ) Notice: Subject to any disclaimer, the term of this patent is extended or adjusted under 35 U.S.C. 154(b) by 0 days.

(21) Appl. No.: 17/553,138

(22) Filed: Dec. 16, 2021

(51) Int. Cl.
| | |
|---|---|
| *F16C 19/52* | (2006.01) |
| *F16C 35/04* | (2006.01) |
| *F16C 19/06* | (2006.01) |
| *F16C 33/58* | (2006.01) |
| *F16C 41/00* | (2006.01) |
| *F16C 33/66* | (2006.01) |

(52) U.S. Cl.
CPC ............ *F16C 35/042* (2013.01); *F16C 19/06* (2013.01); *F16C 19/52* (2013.01); *F16C 33/586* (2013.01); *F16C 33/6622* (2013.01); *F16C 41/007* (2013.01)

(58) Field of Classification Search
CPC ........ F16C 19/06; F16C 19/52; F16C 19/522; F16C 19/525; F16C 19/527; F16C 33/586; F16C 33/6622; F16C 41/007; F16C 2233/00; G01L 5/0009; G01M 13/045; G01P 3/443
See application file for complete search history.

(56) References Cited

U.S. PATENT DOCUMENTS

| | | | | |
|---|---|---|---|---|
| 3,052,123 | A | * | 9/1962 | Gustafson ............. F16C 37/002 374/185 |
| 5,433,525 | A | | 7/1995 | El-Ibiary |
| 5,509,310 | A | * | 4/1996 | El-Ibiary ................. F16C 17/02 73/660 |
| 5,585,577 | A | * | 12/1996 | Lemoine .............. H01R 39/643 73/866.5 |
| 5,642,105 | A | | 6/1997 | Duffy et al. |
| 6,007,250 | A | | 12/1999 | Brauer et al. |
| 6,338,281 | B1 | * | 1/2002 | El-Ibiary ................. F16C 41/00 73/862.381 |

(Continued)

FOREIGN PATENT DOCUMENTS

| | | |
|---|---|---|
| EP | 3663011 A1 | 6/2020 |
| WO | 201605550 A1 | 1/2016 |
| WO | 2020105010 A1 | 5/2020 |

*Primary Examiner* — Phillip A Johnson
(74) *Attorney, Agent, or Firm* — Harness, Dickey & Pierce, P.L.C.

(57) ABSTRACT

A sensor bearing housing assembly for use with or integrally formed with a bearing housing. The bearing housing having a base portion defining a footprint, a shaft receiving collar, and a bearing race disposed between the shaft receiving collar and the bearing housing. The sensor bearing housing assembly having a pair of lengthwise sidewalls configured to extend upward from the base portion and an endwise sidewall configured to extend upward from the base portion. The pair of lengthwise sidewalls and the endwise sidewall being joined to form a sensor volume for receiving a sensor therein generally defined within a vertical volume bounded by the footprint of the base portion. The sensor bearing housing assembly having a cutout formed in at least one of the pair of lengthwise sidewalls and the pair of endwise sidewall to permit access to a fastener extending through a mounting hole formed in the base portion.

20 Claims, 6 Drawing Sheets

(56) References Cited

U.S. PATENT DOCUMENTS

| | | | |
|---|---|---|---|
| 6,648,516 B2 | 11/2003 | Eriksson et al. | |
| 7,070,332 B2 * | 7/2006 | Ostling | F16C 35/047 |
| | | | 384/448 |
| 8,840,311 B2 | 9/2014 | Landrieve | |
| 8,978,424 B2 | 3/2015 | Niarfeix et al. | |
| 9,453,780 B2 | 9/2016 | Erskine et al. | |
| 10,724,995 B2 * | 7/2020 | Thomson | G01N 33/2888 |
| 2002/0094145 A1 * | 7/2002 | Itou | F16C 41/007 |
| | | | 384/448 |
| 2015/0338326 A1 | 11/2015 | Campbell et al. | |
| 2021/0040987 A1 | 2/2021 | Riedel et al. | |

* cited by examiner

SENSOR BEARING HOUSING

FIELD

The present disclosure relates to a bearing housing and, more particularly, relates to a bearing housing that is particularly configured to protect a sensor assembly associated therewith.

BACKGROUND AND SUMMARY

This section provides background information related to the present disclosure which is not necessarily prior art. This section also provides a general summary of the disclosure, and is not a comprehensive disclosure of its full scope or all of its features.

It is becoming more critical to monitor the operating parameters of roller bearing systems to ensure proper operation and longevity of the bearing system and associated machinery. In some embodiments, these operating parameters can include, but are not limited to, temperature and/or vibration. Such operating parameters can be helpful indicators of potential bearing failures or other operational concerns. In fact, by way of example, it is generally understood that bearing temperature rise can often indicate that the bearing is not working or performing at optimum conditions. A rise in temperature can often be used as a surrogate for determining the bearing health and likely useful life. In situations where bearing wear—potentially caused by degradation, reduced lubrication, or other contamination—is leading to reduced bearing performance, a commensurate increased in friction and resultant heat is experienced. Therefore, the monitoring of temperature is often important in determining the safe and reliable operation of bearing systems.

Likewise, the monitoring of vibration can be used to further determine bearing health. An increase in vibration or a change in established vibration frequency can often be used as a surrogate for determine excessive wear of the bearing systems, such as wear in the roller bearings and/or race. A change in vibration characteristics can indicate a need for lubrication, maintenance, and/or an impending bearing failure. Therefore, monitoring vibration can also be important in determining the safe and reliable operation of bearing systems.

However, conventional bearing systems can and are used in a wide variety of applications and environments that may lead to space and/or environmental limitations when attempting to employ sensor systems. For example, in some applications, conventional bearing housings (i.e. without sensor systems) may be mounted in space-constrained locations, which limit the size of the bearing housing and prevent use of sensor systems that add to the defined volume of the bearing housing. Unfortunately, the lack of a sensor system prevents monitoring of the bearing operation and associated bearing health.

Accordingly, there is a need to provide a bearing housing system that is configured to receive, contain, and/or protect one or more sensors to monitor the operation of the bearing. Further, there is a need to provide a bearing housing system that is sufficiently compact to fit within a volume defined generally by the footprint and height of the bearing housing to enable its use in space-constrained applications. Moreover, there is a need to provide a bearing housing system that, in some embodiments, form bits and/or is integral with the bearing housing. Furthermore, there is a need to provide a sensor bearing housing that overcome the deficiencies of the prior art.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

In accordance with the principles of the present teachings, as illustrated in FIGS. 2-10, a sensor bearing housing 10 is provided having a wide variety of benefits and advantageous over the prior art. As will be described herein, the present teachings provide a system, arrangement, and/or housing system that is particularly configured to contain, house, protect, support, and/or seal one or more sensor system components 50 for use in monitoring the operation and/or function of a conventional bearing system. As will be understood from the following disclosure, the sensor bearing housing 10 can be formed as a retrofit system (see FIGS. 2-3 and 8-10) or can be formed integral with a bearing housing as a unitary system (see FIGS. 4-7).

Figure 1:
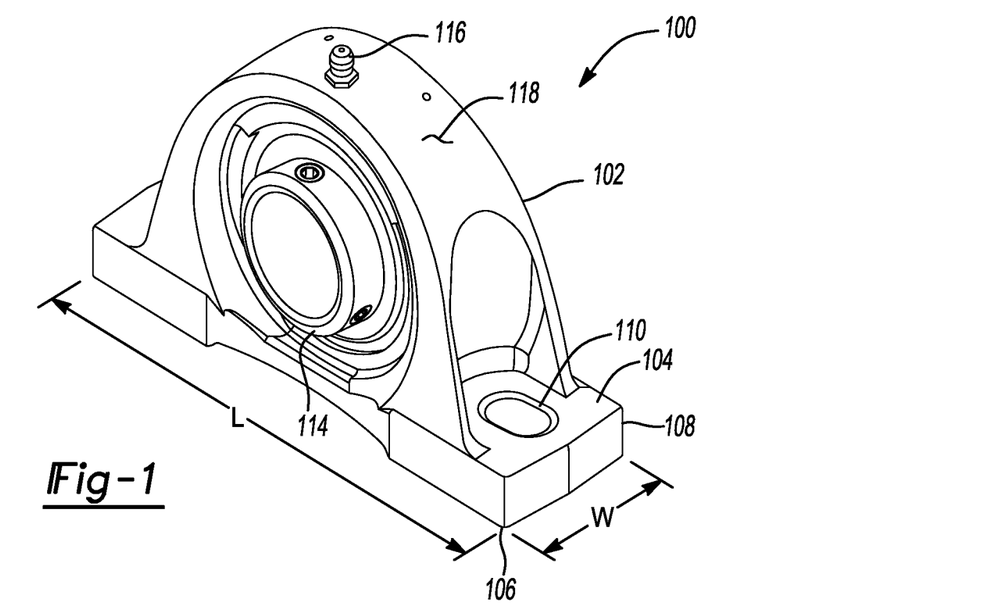
FIG. 1 illustrates a bearing housing according to the prior art.

Briefly, by way of background, conventional bearing housing system 100, such as that illustrated in FIG. 1, generally comprises a housing member 102 having a base portion 104 sized and configured to be mounted to a mounting surface. The base portion 104 conventionally defines a footprint 106 having a width W and a length L. Although variations exist in conventional housing members, traditionally footprint 106 is generally rectangular. Base portion 104 can comprise an enlarged rigid block base 108 having a thickness sufficient to permit mounting of base portion 104 to the mounting surface via conventional fasteners through mounting holes 110. Access to the fasteners is generally provided from a top or side position.

With continued reference to FIG. 1, housing member 102 can be configured as a split pillow block housing arrangement having base portion 104 mounted to an upper portion, or, in some embodiments, housing member 102 can be configured with an integral pillow block housing assembly. Housing member 102 can including a generally arcuate top portion 118. Bearing housing system 100 can further comprise a shaft receiving collar 114 supported by a bearing race (not shown) internal within housing member 102 and generally coaxial with the arcuate top portion. Collar 114 can rotationally support a shaft (not shown) received therein in a conventional manner. Rotation of the shaft within the collar results in rotation of the internal bearing race resulting in wear. To reduce such wear and provide lubrication to the internal bearing race, housing member 102 often includes a lubrication fitting (i.e. Zerk fitting) 116 providing fluid access to bearing race to introduce lubrication (i.e. grease) therein.

With particular reference to FIGS. 2-7, in accordance with some embodiments of the present teachings, a sensor bearing housing 10 is provided and configured to contain, house, protect, support, and/or seal one or more sensor system components for use in monitoring the operation and/or function of a conventional bearing system and, particularly, the operational condition of the bearing race. In some embodiments, the sensor bearing housing 10 can comprise a structure that generally surrounds at least a portion of the bearing housing system 100 so as not to significantly increase the overall volume or envelope of the bearing housing. In some embodiments, this arrangement minimizes interference with surrounding machinery and/or components, and further enables existing installations to be easily upgraded without the need for installation modifications.

Figure 2A:
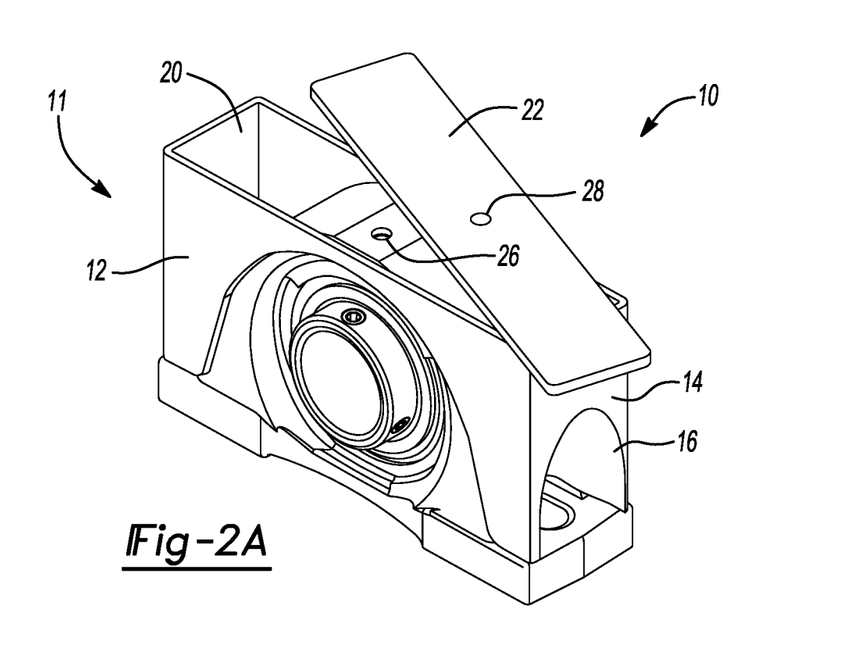
FIG. 2A illustrates a sensor bearing housing assembly having a lid configured for use with a bearing housing according to the principles of the present teachings.
Figure 2B:
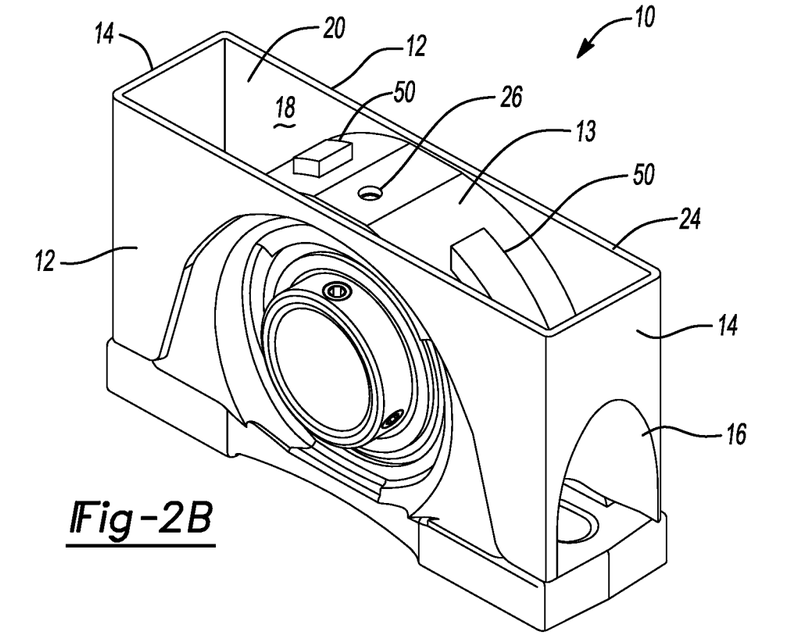
FIG. 2B illustrates the sensor bearing housing assembly of FIG. 2A, with the lid removed for clarity, according to the principles of the present teachings.

With reference to FIGS. 2A and 2B, in some embodiments, sensor bearing housing assembly 10 can comprise a series of wall structures 11 generally extending upward from base portion 104 of bearing housing system 100. In particular, sensor bearing housing 10 can comprise a pair of lengthwise sidewalls 12 extending vertically and generally aligned with length side of footprint 106 and a pair of endwise sidewalls 14 extending vertically and generally aligned with width side of footprint 106. In some embodiments, the pair of lengthwise sidewalls 12 and the pair of endwise sidewalls 14 extend upward to a height that is generally even with, or only slightly higher than, a top of arcuate top portion 118. In some embodiments, an internal bottom wall 13 extends between the pair of lengthwise sidewalls 12 and the pair of endwise sidewalls 14, and in some embodiments generally adjacent arcuate top portion of housing member 102, to define a bottom wall of the wall structures. It should be understood that internal bottom wall 13 may be considered optional in some applications and environments.

Figure 3:
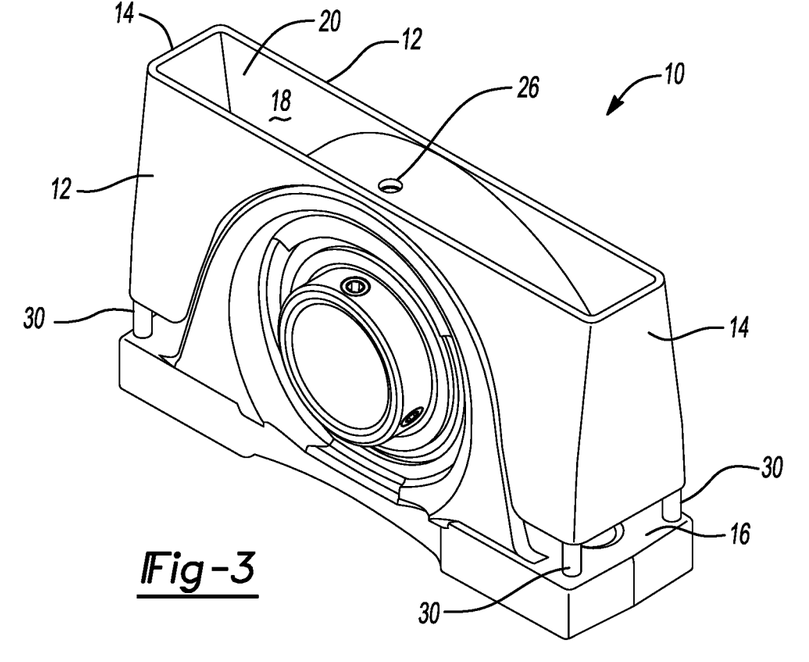
FIG. 3 illustrates a sensor bearing housing assembly having a plurality of legs according to the principles of the present teachings.
Figure 4:
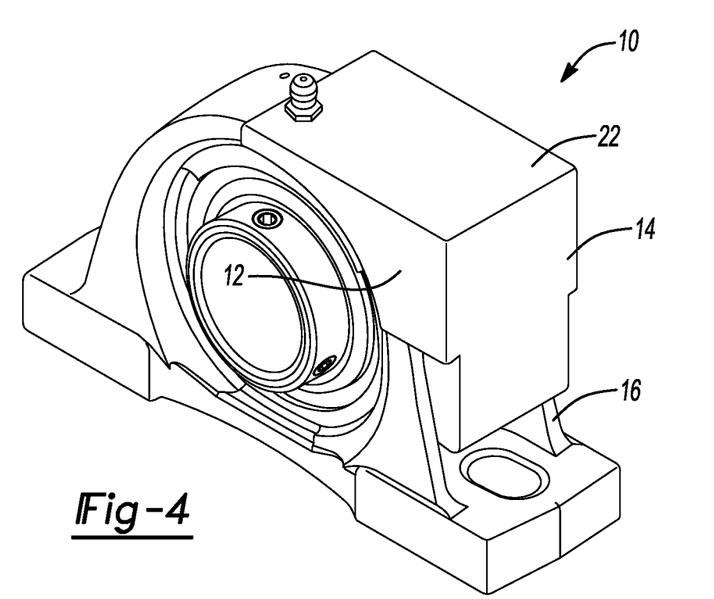
FIG. 4 illustrates a reduced-volume sensor bearing housing assembly configured for use with a bearing housing according to the principles of the present teachings.
Figure 5:
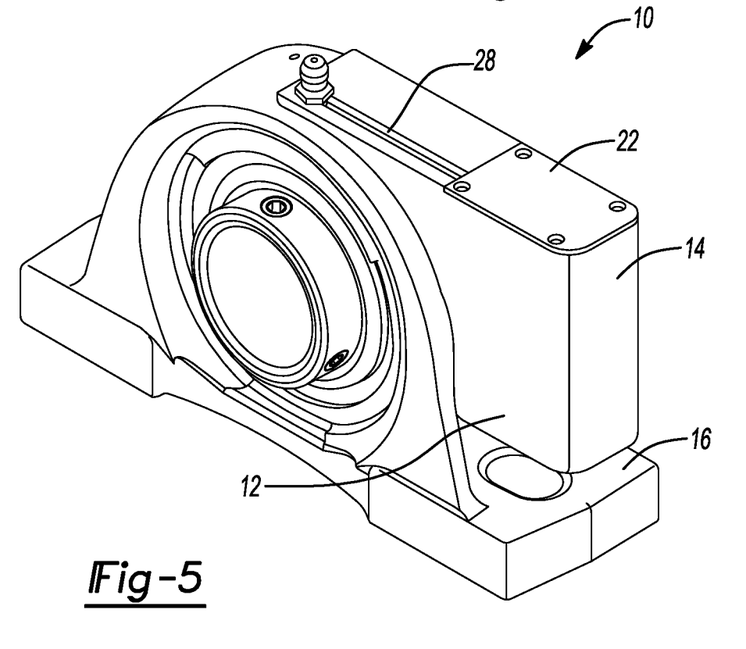
FIG. 5 illustrates a reduced-volume sensor bearing housing assembly configured for use with a bearing housing according to the principles of the present teachings.

In some embodiments, at least one of the pair of lengthwise sidewalls 12 and the pair of endwise sidewalls 14 can comprise a side cutout 16 to permit tool access to the fastener when mounting base portion 104 to a mounting surface. In some embodiments, side cutout 16 can be disposed in each of the pair of endwise sidewalls 14. Moreover, in some embodiments, side cutout 16 can comprise a fastener volume that is sufficiently wide, high, and deep to permit placement of a fastener through mounting hole 110. In some embodiments, side cutout 16 can comprise an arcuate shaped access. It should be understood, however, that alternative shapes of side cutout 16 are envisioned, such as a flat cutout that extends through the pair of lengthwise sidewalls 12 and through endwise sidewall 14, as illustrated in FIGS. 3-5.

Figure 7:
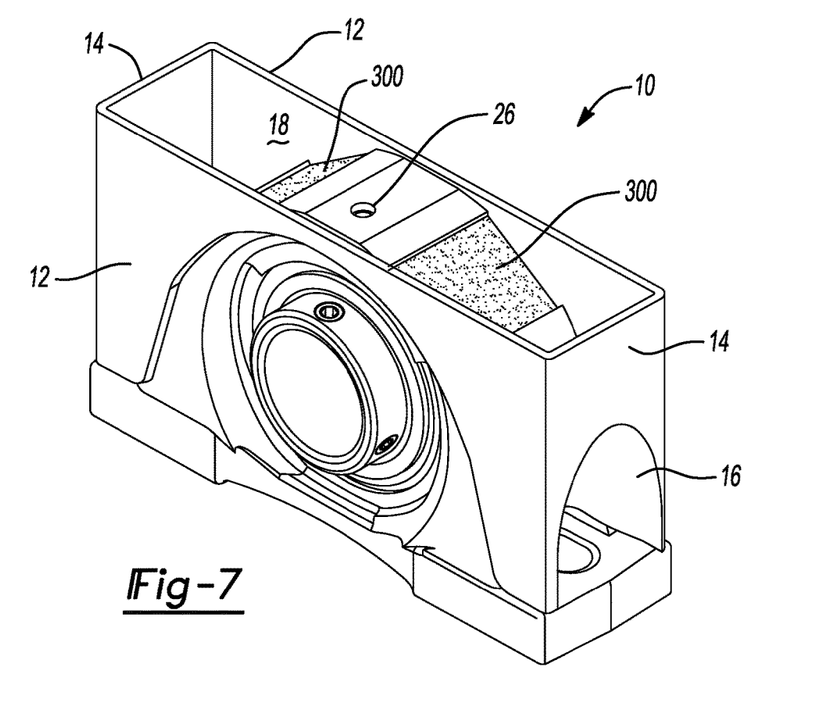
FIG. 7 illustrates the sensor bearing housing assembly of FIG. 2A, with an energy harvester installed within the sensor volume according to the principles of the present teachings.

The pair of lengthwise sidewalls 12, the pair of endwise sidewalls 14, and the optional internal bottom wall 13 together enclose a sensor volume 18 that is sized and configured to receive one or more sensor components 50. It should be understood that sensor components 50 can comprise any one or more components useful in a sensor system, such as, but not limited to, electronic components, sensors, temperature sensors, vibration sensors, circuits, circuit boards, power sources, energy harvesters, transmitters, receivers, indicators, lights, alarms, and similar items. In some embodiments, as illustrated in FIG. 7, an energy harvester 300 can be mounted within sensor volume 18, such as depicted in FIG. 7, to provide harvesting of energy, such as vibration and/or heat, to provide a power source for the sensor components.

In some embodiments, sensor volume 18 can have an opened top side 20. The opened top side 20 can be covered via a mountable lid 22 that is generally sized and configured to enclose sensor volume 18 or a portion thereof. Although not illustrated in each figure in the interest of brevity, it should be understood that lid 22 may be used with any illustrated embodiment, unless otherwise noted.

In some embodiments, mountable lid 22 can sealingly engage a lip 24 formed about the edge of the pair of lengthwise sidewalls 12 and the pair of endwise sidewalls 14. In some embodiments, mountable lid 22 and/or lip 24 can comprise a sealing member and/or sealing interface to define a fluidic seal therebetween to protect any sensor components within sensor volume 18 and/or prevent contamination within sensor volume 18 to enter a clean space within the adjacent environment. In some embodiments, mountable lid 22 (and in some embodiments, internal bottom wall 13 having through hole 26) can be removably mounted via lubrication fitting 116. That is, lubrication fitting 116, having a threaded end portion, can extend through a mounting hole 28 formed in mountable lid 22, through hole 26 of bottom wall 13, and threadedly engage a mounting hole formed bearing housing 102. Thus, lubrication fitting 116 threadedly captures and retains mountable lid 22 and the wall structure 11 of sensor bearing housing assembly 10 upon bearing housing 102, without the need to drill and tap a new mounting hole in bearing housing 102. However, it should be understood, that in applications requiring a more robust mounting engagement or alternative mounting engagement, additional mounting holes and/or systems can be used, such as but not limited to a snap fit system, sliding mounting system, friction fit system, or any other mounting system.

With reference to FIG. 3, in some embodiments, sensor bearing housing assembly 10 can comprise a plurality of leg members 30 extending from each corner of wall structure 11. That is, in some embodiments, a leg member 30 extends from the corner of each lengthwise sidewall 12 and endwise sidewall 14, which can rest on or be coupled to block base 108. Moreover, as previously described, side cutout 16 are envisioned, such as a flat cutout that extends through the pair of lengthwise sidewalls 12 and through endwise sidewall 14. In this way, internal bottom wall 13 can extend down to the side cutout 16, thereby providing additional internal volume within sensor volume 18.

In some embodiments, as illustrated in FIGS. 4 and 5, sensor bearing housing assembly 10 can comprise a reduced volume configuration wherein sensor bearing housing assembly 10 is generally one half or smaller of a fully configuration version (see FIGS. 2A-3). In this way, bearing housing assembly 10 can comprise a pair of lengthwise sidewalls 12 and a single endwise sidewall 14 that together define sensor volume 18. This reduced volume configuration is particularly useful in applications with limited space on a side of bearing housing 100 and/or applications requiring only few sensor components. Similar to the embodiment of FIGS. 2A-2B, sensor bearing housing assembly 10 of FIGS. 4 and 5 can be mounted to bearing housing 100 via lubrication fitting 116 as described herein.

In some embodiments, as illustrated in FIGS. 6A-6C and 8, sensor bearing housing assembly 10 can be integrally formed with bearing housing 102—that is, in some embodiments, sensor bearing housing assembly 10 and bearing housing 102 is a singular unit referred to as integral sensor bearing housing assembly 10'. In some embodiments, integral sensor bearing housing assembly 10' comprises a housing member 202 having a base portion 204 sized and configured to be mounted to a mounting surface. The base portion 204 defines a footprint 206 having a width W and a length L. Base portion 204 can comprise an enlarged rigid block base 208 having a thickness sufficient to permit mounting of base portion 204 to the mounting surface via conventional fasteners through mounting holes 220. Access to the fasteners is generally provided from a side position via side cutouts 226.

Figure 6A:
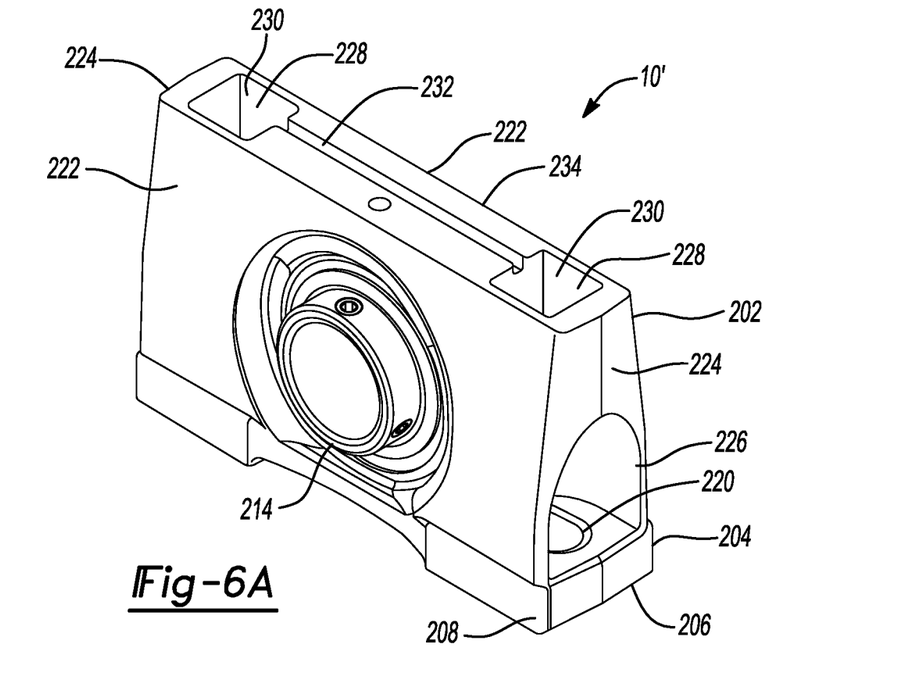
FIG. 6A illustrates an integral sensor bearing housing assembly with a lid removed according to the principles of the present teachings.
Figure 6B:
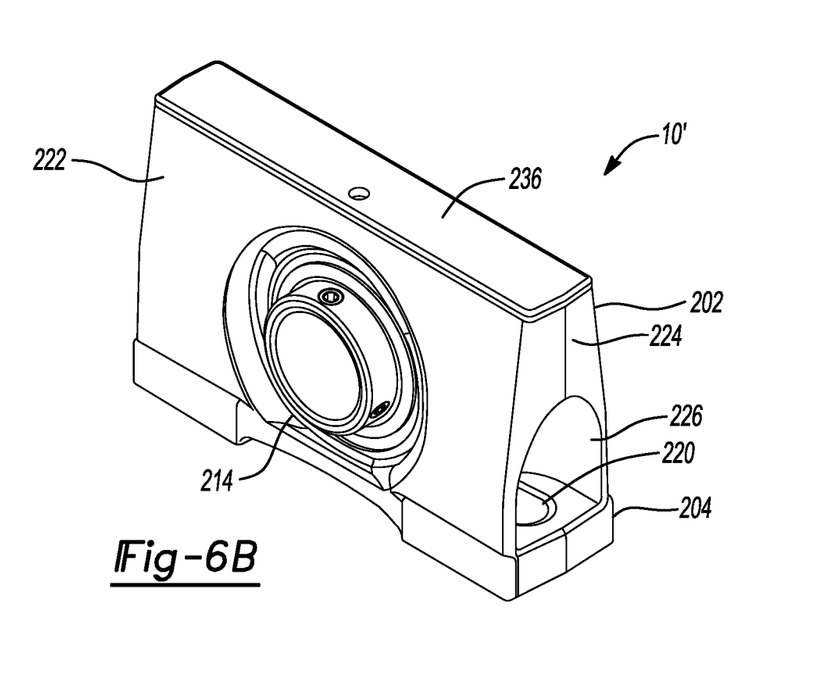
FIG. 6B illustrates the integral sensor bearing housing assembly of FIG. 6A with the lid installed according to the principles of the present teachings.
Figure 6C:
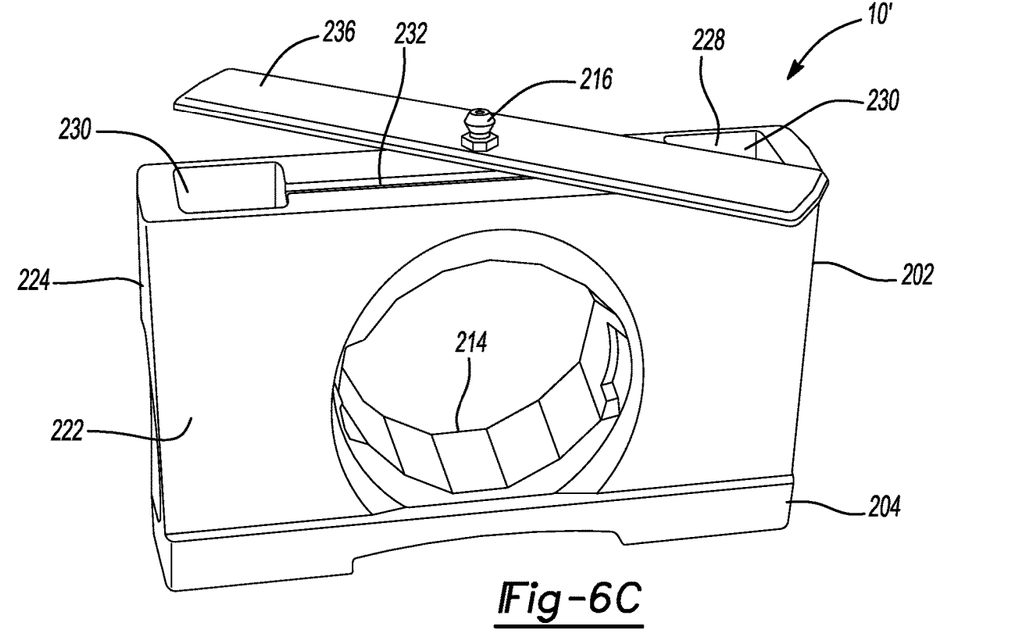
FIG. 6C illustrates the integral sensor bearing housing assembly of FIG. 6A with the lid partially installed according to the principles of the present teachings.

Sensor bearing housing assembly 10' can further comprise a shaft receiving collar 214 supported by a bearing race (not shown) internal within housing member 202. Collar 214 can rotationally support a shaft (not shown) received therein in a conventional manner. Rotation of the shaft within the collar results in rotation of the internal bearing race. Sensor bearing housing assembly 10' can include a lubrication fitting (i.e. Zerk fitting) 216 providing fluid access to bearing race to introduce lubrication (i.e. grease) therein.

In some embodiments, sensor bearing housing assembly 10' can comprise a series of wall structures 221 generally extending upward from base portion 204 of sensor bearing housing assembly 10'. In particular, sensor bearing housing assembly 10' can comprise a pair of lengthwise sidewalls 222 extending vertically and generally aligned with length side of footprint 206 and a pair of endwise sidewalls 224 extending vertically and generally aligned with width side of footprint 206. In some embodiments, the pair of lengthwise sidewalls 222 and the pair of endwise sidewalls 224 extend upward to height that is generally even with a top of a conventional arcuate top portion.

Figure 8A:
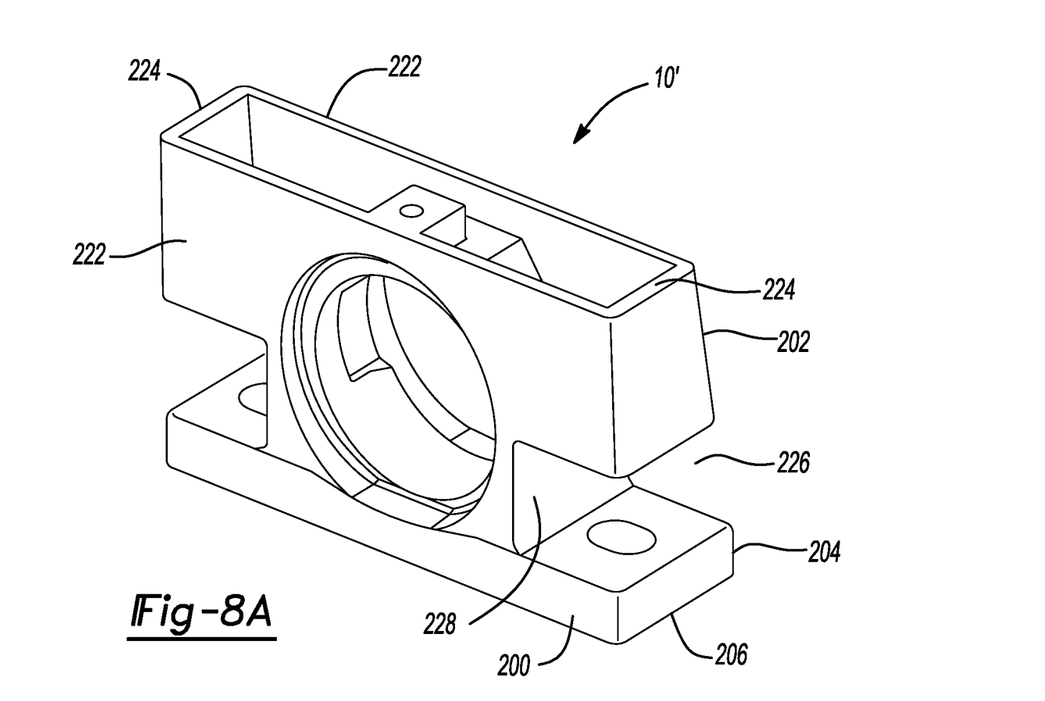
FIG. 8A illustrates an integral sensor bearing housing assembly according to the principles of the present teachings.
Figure 8B:
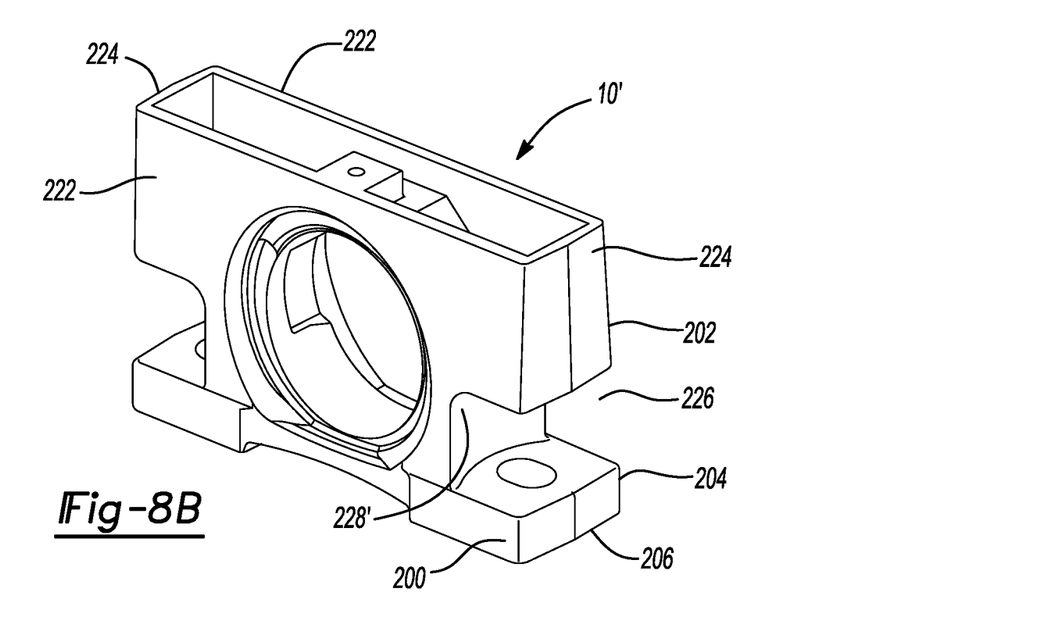
FIG. 8B illustrates an integral sensor bearing housing assembly according to the principles of the present teachings.

In some embodiments, at least one of the pair of lengthwise sidewalls 222 and the pair of endwise sidewalls 224 can comprise a side cutout 226 to permit tool access to the fastener when mounting base portion 204 to a mounting surface. In some embodiments, side cutout 226 can be disposed in each of the pair of endwise sidewalls 224 (see FIGS. 6A-6C). In some embodiments, side cutout 226 can be disposed in the pair of endwise sidewalls 224 and the pair of sidewalls 222 (see FIGS. 8A-8B). Moreover, in some embodiments, side cutout 226 can comprise a fastener volume that is sufficiently wide, high, and deep to permit placement of a fastener through mounting hole 220. In some embodiments, side cutout 226 can comprise an arcuate shaped access (FIGS. 6A-6C) or a rectangular access (FIGS. 8A-8B). It should also be appreciated that in some embodiments a facing surface 228 can be flat (228, FIG. 8A) or can be curved (228', FIG. 8B). The curved facing surface 228' can aid in provide clearance relative to the fastener or associated tool within side cutout 226. Furthermore, it should be understood, however, that alternative shapes of side cutout 226 are envisioned, such as a flat cutout that extends through the pair of lengthwise sidewalls 222 and through endwise sidewall 224, as illustrated in FIGS. 3-5.

The pair of lengthwise sidewalls 222, the pair of endwise sidewalls 224, and an internal bottom wall (not shown) together enclose a sensor volume 228 that is sized and configured to receive one or more sensor components. As illustrated in FIGS. 5 and 7, in some embodiments, sensor volume 228 can comprise series of discrete compartments 230 for retaining and/or separating various sensor components. In some embodiments, a groove or channel 232 can extend between compartments 230 to facilitate routing of wiring or other components.

In some embodiments, sensor volume 228 can have an opened top side 234. The opened top side 234 can be covered via a mountable lid 236 that is generally sized and configured to enclose sensor volume 228.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A sensor bearing housing assembly for use with a bearing housing, the bearing housing having a base portion defining a footprint, a shaft receiving collar, and a bearing race disposed between the shaft receiving collar and the bearing housing, the sensor bearing housing assembly comprising:
   a pair of lengthwise sidewalls configured to extend upward from the base portion;
   an endwise sidewall configured to extend upward from the base portion, the pair of lengthwise sidewalls and the endwise sidewall being joined to form a sensor volume generally defined within a vertical volume bounded by the footprint of the base portion, the sensor volume configured to receive a sensor component therein;
   a cutout formed in at least one of the pair of lengthwise sidewalls and the endwise sidewall, the cutout being sized and shaped to permit access to a fastener extending through a mounting hole formed in the base portion.

2. The sensor bearing housing assembly of claim 1 wherein the pair of lengthwise sidewalls and the endwise sidewall extend to a height that is generally equal to a height of the bearing housing.

3. The sensor bearing housing assembly of claim 1 wherein the pair of lengthwise sidewalls and the endwise sidewall extend to a height that is higher than a height of the bearing housing.

4. The sensor bearing housing assembly of claim 1, further comprising:
   a bottom wall disposed within the sensor volume, the bottom wall being joined to at least one of the pair of lengthwise sidewalls and the endwise sidewall to at least partially enclose a bottom side of the sensor volume.

5. The sensor bearing housing assembly of claim 4 wherein the bottom wall comprises a mounting hole configured to receive a fastener to threadedly retain the sensor bearing housing assembly to the bearing housing.

6. The sensor bearing housing assembly of claim 1 wherein the sensor bearing housing assembly is selectively connectable to the bearing housing.

7. The sensor bearing housing assembly of claim 1, further comprising:
   a lid configured to engage a top peripheral surface of the pair of lengthwise sidewalls and the endwise sidewall and enclose the sensor volume.

8. The sensor bearing housing assembly of claim 7 wherein the lid comprises a sealing interface between the lid and the top peripheral surface of the pair of lengthwise sidewalls and the endwise sidewall.

9. The sensor bearing housing assembly of claim 7 wherein the lid is selectively connectable to at least one of the pair of lengthwise sidewalls and the endwise sidewall.

10. The sensor bearing housing assembly of claim 1 wherein the endwise sidewall comprises a pair of endwise sidewalls disposed on opposing ends of the pair of lengthwise sidewalls.

11. The sensor bearing housing assembly of claim 1, further comprising:
   a sensor component disposed within the sensor volume, the sensor component operable to at least in part monitor an operating condition of a bearing of the bearing housing.

12. The sensor bearing housing assembly of claim 1, further comprising:
   a sensor component disposed within the sensor volume, the sensor component operable to harvest energy in response to operation of a bearing of the bearing housing.

13. A sensor bearing housing assembly comprising:
   a base portion defining a footprint, the base portion having:
      a pair of lengthwise sidewalls extending upward from the base portion and a pair of endwise sidewalls extending upward from the base portion, the pair of lengthwise sidewalls and the pair of endwise sidewalls being joined to form a sensor volume generally defined within a vertical volume bounded by the footprint of the base portion, the sensor volume configured to receive a sensor component therein; and
      a cutout formed in at least one of the pair of lengthwise sidewalls and the pair of endwise sidewalls, the cutout being sized and shaped to permit access to a fastener extending through a mounting hole formed in the base portion;

a shaft receiving collar; and a bearing race disposed between the shaft receiving collar and the base portion.

14. The sensor bearing housing assembly of claim 13, further comprising:

a lid configured to engage a top peripheral surface of the pair of lengthwise sidewalls and the pair of endwise sidewalls and enclose the sensor volume.

15. The sensor bearing housing assembly of claim 14 wherein the lid comprises a sealing interface between the lid and the top peripheral surface of the pair of lengthwise sidewalls and the pair of endwise sidewalls.

16. The sensor bearing housing assembly of claim 14 wherein the lid is selectively connectable to at least one of the pair of lengthwise sidewalls and the pair of endwise sidewalls.

17. The sensor bearing housing assembly of claim 13, further comprising:

a sensor component disposed within the sensor volume, the sensor component operable to at least in part monitor an operating condition of a bearing of the bearing housing.

18. The sensor bearing housing assembly of claim 13, further comprising:

a sensor component disposed within the sensor volume, the sensor component operable to harvest energy in response to operation of a bearing of the bearing housing.

19. The sensor bearing housing assembly of claim 13 wherein the sensor volume comprises a plurality of chambers configured to receive a plurality of sensor components.

20. The sensor bearing housing assembly of claim 13 wherein the cutout is formed in each of the pair of lengthwise sidewalls and at least one of the pair of endwise sidewalls to permit access to the fastener from opposing lengthwise sides of the base portion.

* * * * *